Patented Sept. 25, 1934

1,974,854

UNITED STATES PATENT OFFICE 1,974,854

PROCESS FOR PRODUCING SHOEBLACKINGS, POLISHING-WAXES, AND SUCH LIKE

Walther Schrauth, Berlin-Dahlem, Germany, assignor, by mesne assignments, to "Unichem" Chemikalien Handels A.-G., Zurich, Switzerland, a corporation of Switzerland No Drawing. Application December 21, 1932, Serial No. 648,317. In Germany December 21, 1931

6 Claims. (Cl. 134—9)

For producing shoe-blackings, polishing waxes, floor-waxes and the like in general solid hydrocarbons are used such as paraffin, ceresin in admixture with waxes such as beeswax, carnauba-wax, and Montan-wax saponified or unsaponified with the addition of oil of turpentine, hydrogenated naphthalene or the like. According to the special purpose of use specific additions of dyestuffs, especially coal-tar-dyes, such as nigrosine, fatty orange and so on are added to these mixtures. Now it is difficult to disperse the dyestuffs in the cremes and wax-mixtures because the dye-solution must be especially prepared and kept in stock, and because the dyestuff-base must first be heated up with stearic- or oleic acid to provide material sufficiently soluble for shoe-blackings and polishings waxes. However, it is not always desired to have products with a content of stearic acid.

Now it has been found that the high-molecular aliphatic alcohols such as lauric alcohol, oleic alcohol, and such like are excellent solvents and distributing agents for dyestuffs. Therefore it is possible to produce shoe-blackings, polishing-waxes and the like without preparing especially the dyestuffs and to distribute the dyestuffs by means of the fatty alcohols immediately into the wax-mixtures. Because these alcohols are adapted for dissolving dyestuffs soluble in fats as well as dyestuffs soluble in spirit or water a very much larger number of dyestuffs can be used for the mentioned purposes. So polishing waxes or shoe-blacking can be colored by means of these alcohols with dyestuffs such as pyramidol-brown, spirit-yellow and sudan G (see Schultz-Julius, Farbstofftabellen, 1914, No. 317; 31 and 35). The dissolving and dispersing effect of the fatty alcohols results in the further very decided advantage that a smaller quantity of dyestuffs such as coal tar dyes suffices to give the required color effect. Finally also the fatty alcohols possess an excellent distributing power for insoluble dyestuffs as for instance lamp-black. Therefore effective coatings can be obtained by the use of waxes made in accordance with this invention.

Example 1

48 kg. carnauba wax are melted on in a suitable boiler and 92 kg. Montan wax, 60 kg. ceresin and 65 kg. paraffin are dissolved in the melted wax. Thereupon 25 kg. cetyl alcohol and 8 kg. nigrosine are added and the whole is stirred thoroughly. After cooling to 70—80° 700 kg. oil of turpentine first heated up to 50° are added.

Example 2

For producing a yellow polishing wax 60 kg. ceresin, 90 kg. paraffin and 30 kg. residues of carnauba-wax are melted together and 10 kg. of an oleyl-stearyl-alcohol-mixture, to which is added 2 kg. dyestuffs (sudan), are mixed by stirring and thereupon 450 kg. oil of turpentine are added. It will be noted that in these examples the fatty alcohol added is of the order of 5 to 10% of the weight of the wax.

What I claim is:—

1. Process for colouring shoe-blackings, polishing-waxes and floor-waxes characterized by using cetyl alcohol for distributing the dyestuffs.

2. A composition of matter comprising wax, dye-stuff and fatty alcohol having of the order of 12 to 18 carbon atoms in the molecule, the proportion of the alcohol being of the order of 5 to 10% of the weight of the wax.

3. A composition of matter comprising wax, dye-stuff, turpentine and fatty alcohol having of the order of 12 to 18 carbon atoms in the molecule, the proportion of the alcohol being of the order of 5 to 10% of the weight of the wax.

4. A composition of matter comprising wax, dyestuff and fatty alcohol of the group consisting of lauryl, cetyl, stearyl and oleyl, the proportion of the alcohol being of the order of 5 to 10% of the weight of the wax.

5. A composition of matter comprising carnauba wax, Montan wax, ceresin, paraffin, cetyl alcohol, a dye and turpentine.

6. A composition of matter comprising ceresin, paraffin, carnauba wax, a mixture of oleyl and stearyl alcohol, a dye and turpentine.

WALTHER SCHRAUTH.